(12) United States Patent
Baddepudi et al.

(10) Patent No.: US 8,099,577 B2
(45) Date of Patent: Jan. 17, 2012

(54) MANAGING MEMORY IN A SYSTEM THAT INCLUDES A SHARED MEMORY AREA AND A PRIVATE MEMORY AREA

(75) Inventors: Bharat C. V. Baddepudi, San Jose, CA (US); Tirthankar Lahiri, Palo Atlo, CA (US); Kiran B. Goyal, Foster City, CA (US); Benoit Dageville, Foster City, CA (US); Siddhartha Roychowdhury, Palo Alto, CA (US); Brian Hirano, Niwot, CO (US); Balasubramanian Narasimhan, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 718 days.

(21) Appl. No.: 11/726,060

(22) Filed: Mar. 20, 2007

(65) Prior Publication Data
US 2008/0235481 A1 Sep. 25, 2008

(51) Int. Cl.
*G06F 12/00* (2006.01)
(52) U.S. Cl. .......... 711/173; 711/E12.002; 711/E12.084
(58) Field of Classification Search .......... None
See application file for complete search history.

(56) References Cited

U.S. PATENT DOCUMENTS

| | | | | |
|---|---|---|---|---|
| 4,914,577 A | * | 4/1990 | Stewart et al. | 711/207 |
| 5,809,554 A | * | 9/1998 | Benayon et al. | 711/171 |
| 6,282,613 B1 | * | 8/2001 | Hsu et al. | 711/118 |
| 6,442,661 B1 | * | 8/2002 | Dreszer | 711/170 |
| 7,093,097 B2 | * | 8/2006 | Herr et al. | 711/171 |
| 7,409,517 B2 | * | 8/2008 | Dageville et al. | 711/170 |
| 7,539,608 B1 | * | 5/2009 | Dageville et al. | 703/21 |
| 2003/0101324 A1 | * | 5/2003 | Herr et al. | 711/170 |
| 2006/0059318 A1 | * | 3/2006 | Rao | 711/147 |
| 2006/0294319 A1 | * | 12/2006 | Mansell | 711/146 |
| 2007/0124274 A1 | * | 5/2007 | Barsness et al. | 707/2 |
| 2008/0134185 A1 | * | 6/2008 | Fedorova | 718/102 |

FOREIGN PATENT DOCUMENTS

WO   WO 03029982 A2 * 4/2003

OTHER PUBLICATIONS

Balasundaram et al. "A Static Performance Estimator to Guide Data Partitioning Decisions." Apr. 1991. PPOPP '91: Proceedings of the third ACM SIGPLAN symposium on Principles and practice of parallel programming.*
Ipek et al. "Self-Optimizing Memory Controllers: A Reinforcement Learning Approach." Jun. 2008. ISCA '08: International Symposium on Computer Architecture (IEEE).*
Burleson, D., "Self-Tuning Oracle9*i* Database: Oracle SGA" downloaded Mar. 21, 2007. <http://www.oracle.com/technology/oramag/webcolumns/2003/techarticles/burleson_auto_...> 6 pages.
Peasland, B., "Tuning PGA_AGGREGATE_TARGET in Oracle 9i" downloaded Mar. 21, 2007. < http://www.quest-pipelines.com/newsletter-v5/0304_A.htm > 5 pages.

* cited by examiner

*Primary Examiner* — Reginald Bragdon
*Assistant Examiner* — Daniel J Bernard
(74) *Attorney, Agent, or Firm* — Hickman Palermo Truong & Becker LLP; Daniel D. Ledesma (57) ABSTRACT

A method and apparatus for auto-tuning memory is provided. Memory on a computer system comprises at least one shared memory area and at least one private memory area. Addresses in the shared memory area are accessible to multiple processes. Addresses in the private memory area are dedicated to individual processes. Initially, a division in the amount of memory is established between the shared and private memory areas. Subsequently, a new division is determined. Consequently, memory from one memory area is "given" to the other memory area. In one approach, such sharing is achieved by causing the shared and private memory areas to be physically separate from each other both before and after a change in the division. The division of the amount of memory may be changed to a new division by deallocating memory from one of the memory areas and allocating that memory to the other of the memory areas.

36 Claims, 4 Drawing Sheets

MANAGING MEMORY IN A SYSTEM THAT INCLUDES A SHARED MEMORY AREA AND A PRIVATE MEMORY AREA

FIELD OF THE INVENTION

The present invention relates generally to memory management and, more specifically, to techniques for automated allocation of memory between a shared memory area and a private memory area.

BACKGROUND

Computer memory is often allocated among multiple memory pools. Memory pools include portions or ranges of memory. A portion or range of memory is often referred to as a "block" of memory. Blocks of memory from different pools are used to satisfy different classes of memory allocation requests. The size of each of the memory pools is typically controlled by and managed through use of separate memory parameters.

With some approaches to memory management, a management system may specify static default values for the sizes of each memory pool based on certain heuristics. For example, a system may have a static default value that specifies that 20% of the available total shared memory should be allocated to memory pool X, and another static default value that specifies that 30% of the available total shared memory should be allocated to memory pool Y. Such values are considered "static" in that they do no change during operation of the system, and any change too them only takes effect after restarting the system.

With other approaches to memory management, a system administrator is responsible for manually sizing memory pools. Any attempt to optimize such sizing typically involves an iterative process of trial and error, and is a difficult task because the different memory pools are used for different purposes. Manual sizing of memory is particularly difficult because what the best allocation of memory for a system under some conditions may be different than the best allocation of memory for the same system under other conditions.

For example, assume that a database server employs a first pool for use when performing backup jobs, and a second pool used for on-line transaction processing (OLTP) activities. If a large amount of memory is allocated to the first pool and a smaller amount to the second pool, then nightly recovery management backup jobs may go smoothly, but daily OLTP activity will suffer. On the other hand, if a large amount of memory is allocated to the second pool, and a smaller amount to the first pool, backup jobs may fail, or may not be completed because the first pool is set too small. The cost of backup failures could be prohibitive from a business point of view, leaving administrators with few other options.

In practice, the memory allocation parameters of a system are rarely adjusted after an administrator sets ("tunes") the memory allocation parameters for a given application or cluster of applications. Failure to adjust the parameters to account for changes causes problems, since undersized pools could lead (1) to application failures due to failure to allocate sufficient memory to given pools, and (2) to performance problems arising from the need to reload data or perform excessive disk I/O. Hence, memory pool allocations are commonly oversized to handle the worst-case scenarios while attempting to avoid system errors, and with the goal of avoiding the need for reallocation. For example, some types of pools are often oversized to prevent application errors, at detriment to the performance of other memory pools. Oversizing memory pools also usually leads to wasted system memory resources.

SMA and PMA

Database servers often have a shared memory area and a private memory area. A shared memory area (SMA) is used to allocate memory for structures that are accessible to many processes. A private memory area (PMA) is used to allocate memory that is to be dedicated to individual processes. While at any given time different portions of the private memory area may be allocated to different processes, only the process to which a portion of the private memory area was allocated is able to access the portion.

An example of a shared memory area is the System Global Area (SGA) used by some database servers. The SGA is a memory pool that is allocated when a database server instance starts up. The SGA typically contains general information about the state of the database server instance and the database that is being managed. The SGA is a memory area that facilitates the transfer of data and information between clients and the database server. The SGA may be used to store, for example, multiple buffer caches, specific block size caches, a shared pool, a large pool, a java pool, and a redo log buffer. The SGA may also contain data and program caches that are shared among database users.

The size of the SGA is typically determined at start up of the database server. For optimal performance in most systems, the entire SGA should fit in real memory. A database administrator (DBA) can see how much memory is allocated to the SGA and each of its internal structures by issuing the SQL statement "SHOW SGA."

An example of a private memory area is the Program Global Area (PGA) used by some database servers. A PGA is created for holding data and control information of a single process (server or background), when the process is started (e.g., when a user connects to a database and a session is created). The portion of the PGA that is used by a process is private to the process, although the PGA itself can be allocated in shared memory or in a separate memory pool.

Thus, whereas individual addresses in the SGA are accessible by multiple processes, an individual address in PGA is dedicated to a single process. Hash joins, sorts, and relatively quick number crunching are some operations that are performed in PGA. The initial size of PGA usable by a process is typically fixed at startup of the corresponding process, and may be dynamically changed based on the workload requirements.

As used hereinafter, "PGA" will refer to the total amount of memory that can be used as PGA. A DBA can control the PGA memory utilization, using various parameters like SORT_AREA_SIZE, HASH_AREA_SIZE, BITMAP_MERGE_AREA_SIZE and CREATE_BITMAP_AREA_SIZE.

Auto-Tuning

Some database system provide mechanisms to individually auto-tune both SGA and PGA. When SGA is auto-tuned, for example, memory is moved automatically between subcomponents of SGA, such as between a buffer cache and the java pool, without the need for user intervention. In other words, the management of SGA and PGA can be completely automated. All a DBA may be required to do is set a maximum amount of memory for each memory area and the multiple parameters of each memory area are thereafter auto-tuned.

U.S. patent application Ser. No. 10/746,471 filed on Dec. 23, 2003, entitled "Techniques for Automated Allocation of Memory Among a Plurality of Pools", describes techniques for auto-tuning SGA; the entire contents of which are incorporated by this reference for all purposes as if fully disclosed herein.

U.S. patent application Ser. Nos. 09/969,334 and 09/969,290 filed on Oct. 1, 2001, describe techniques for auto-tuning PGA; the entire contents of which are incorporated by this reference for all purposes as if fully disclosed herein.

One issue with managing SGA and PGA is determining how much memory to allocate for each. Similar with memory pools discussed above, optimal allocation of memory among SGA and PGA depends on the type of workload that is occurring on a database server. Hence, setting the respective sizes of SGA and PGA to work best with one workload may create memory allocation problems when the database server is working on other types of workloads. For example, assume that a database server has 300 MB of total memory. At 6 PM on any given day, the best memory allocation may be 200 MB for SGA and 100 MB for PGA. On the other hand, at midnight, the optimal allocation may be 150 MB for SGA and 150 for PGA.

However, if memory is not shared among SGA and PGA, then the memory allocation between SGA and PGA will at times be sub-optimal. For example, if PGA has a significant amount of memory that is not being used by any processes and SGA is not able to use at least a portion of that unused memory to decrease the execution time of its corresponding workload, then the "extra" PGA memory is essentially wasted.

The PGA-IN-SGA Approach

Figure 1A:
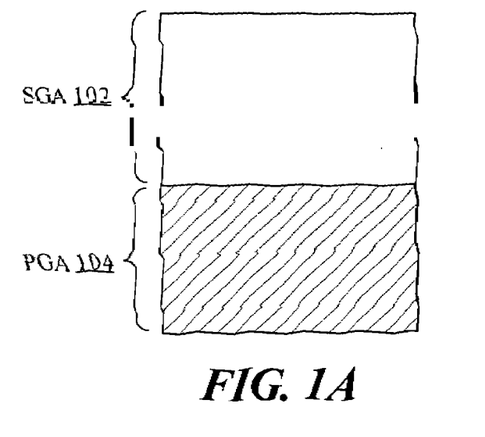
FIGS. 1A-C are block diagrams that illustrate an approach for sharing memory originally allocated to a shared memory with a private memory area.
Figure 1B:
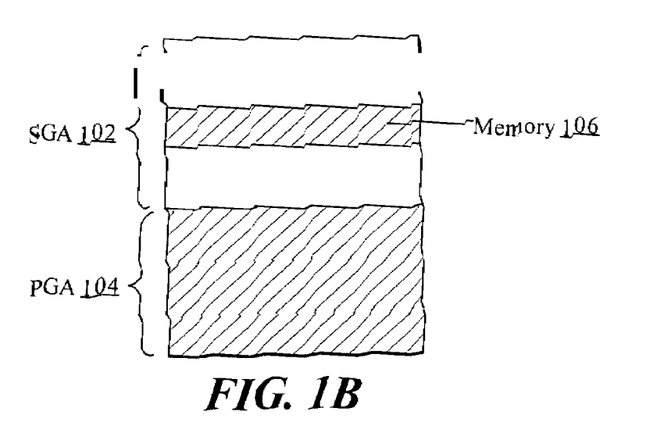
Figure 1C:
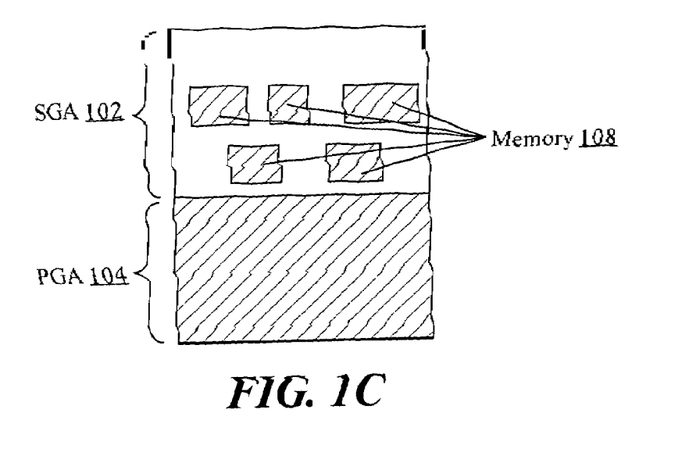

FIGS. 1A-C illustrate a PGA-IN-SGA approach for allowing memory originally allocated to SGA to be used as memory allocated to PGA. FIG. 1A illustrates an SGA 102 and a PGA 104, which is differentiated from SGA 102 by the diagonal lines. FIG. 1B shows how a portion of SGA 102 (i.e., memory 106) may be used as PGA on a temporary basis. Memory 106 is originally allocated for SGA but is used as PGA. The division between SGA 102 and memory 106 is a logical division, not a physical one. In other words, the RAM board associated with the corresponding database instance still indicates that SGA 102 is one contiguous area of logical memory when in reality SGA 102 comprises two separate contiguous areas of physical memory.

However, the PGA-IN-SGA approach suffers from significant drawbacks. First, the PGA-IN-SGA approach is not flexible in that only memory from SGA 102 may be used as PGA 104 but not vice versa. The PGA-IN-SGA approach is also inflexible in that only a limited portion of SGA 102 may be used as PGA 104, even when more processes are requesting additional PGA to perform their respective tasks. Furthermore, because memory in SGA is used as PGA, the ability to fully auto-tune both SGA and PGA is restricted.

Second, cross-component corruption may arise in the PGA-IN-SGA approach. For example, corruption in memory 106 may be encountered when tuning SGA 102, which is a significant issue because the auto-tuning of SGA is not suited for handling PGA-specific errors.

Third, SGA 102 may become fragmented as different portions of SGA (see memory 108 of FIG. 1C) are used as PGA. Fragmentation becomes a significant problem when it causes SGA memory areas to become un-tunable, thus reducing memory available for SGA's components to grab on-demand. A component of SGA (e.g., the java pool) may become un-tunable when that component requires an amount of contiguous memory (e.g., 100K) in SGA 102 that is greater than the largest remaining contiguous portion in SGA 102 (e.g., 75K).

Based on the foregoing, there is a general need for a technique for managing memory that is allocated among a shared memory area (e.g., SGA) and a private memory area (e.g., PGA) that does not result in one or more of the inefficiencies described above.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one aspect, memory space within a computer system is automatically transferred between at least two memory areas: a shared memory area (e.g., SGA) and a private memory area (e.g., PGA). Unlike prior techniques, using the techniques described herein, memory space that is initially allocated to one of SMA and PMA is deallocated relative to that memory area, and then allocated to the other memory area. The memory area from which memory is deallocated during a transfer is referred to herein as the "starting memory area", and the memory area to which memory is allocated during a transfer is referred to herein as the "target memory area".

When the memory is deallocated from the starting memory area, the memory ceases to be governed by the memory management rules associated with the starting memory area. Conversely, when the memory is allocated to the target memory area, the memory begins to be governed by the memory management rules associated with the target memory area.

According to one embodiment, a single parameter is used to indicate the total amount of memory used, collectively, by the shared memory area and the private memory area. In one embodiment, the value of the parameter is set by a user. In other embodiments, the value for the parameter may be set automatically by the system.

The shared memory area and private memory area are physically separate memory areas both before and after a new division of the amount of memory. If it is determined that the shared memory area requires a particular amount of memory and, for example, that particular amount is not being used in the private memory area, then that particular amount may be deallocated from the private memory area and allocated to the shared memory area.

Because the shared memory area and the private memory area are physically separate, memory is not used as the private memory area while that same memory is allocated to the shared memory area. Conversely, memory is not used as the shared memory area while that same memory is allocated to the private memory area.

As another result of the shared memory area and private memory area being physically separate, both shared memory area and private memory area may be auto-tuned independent of the other memory area both before and after a change in the division.

As used hereinafter, "shared memory area" refers to a memory area in which individual addresses thereof may be accessed by multiple processes. "Private memory area", on the other hand, refers to a memory area in which each address thereof is dedicated to at most one process. Furthermore, the use of the terms "shared memory area" and "private memory area" does not imply that each memory area is the only area of that type on the corresponding computer system. For example, there may be multiple shared memory areas on a computer system. One or more of the multiple shared memory areas may have a portion of its memory deallocated and that memory allocated to one or more private memory areas.

The following description discusses a computer system and presupposes a single database instance executing thereon. However, a computer system may have multiple database instances executing thereon, each database instance being associated with its own shared memory area and private memory area. Thus, memory may be deallocated from a starting memory area and allocated to a target memory area of a single database instance.

Example Process Flow

Figure 2:
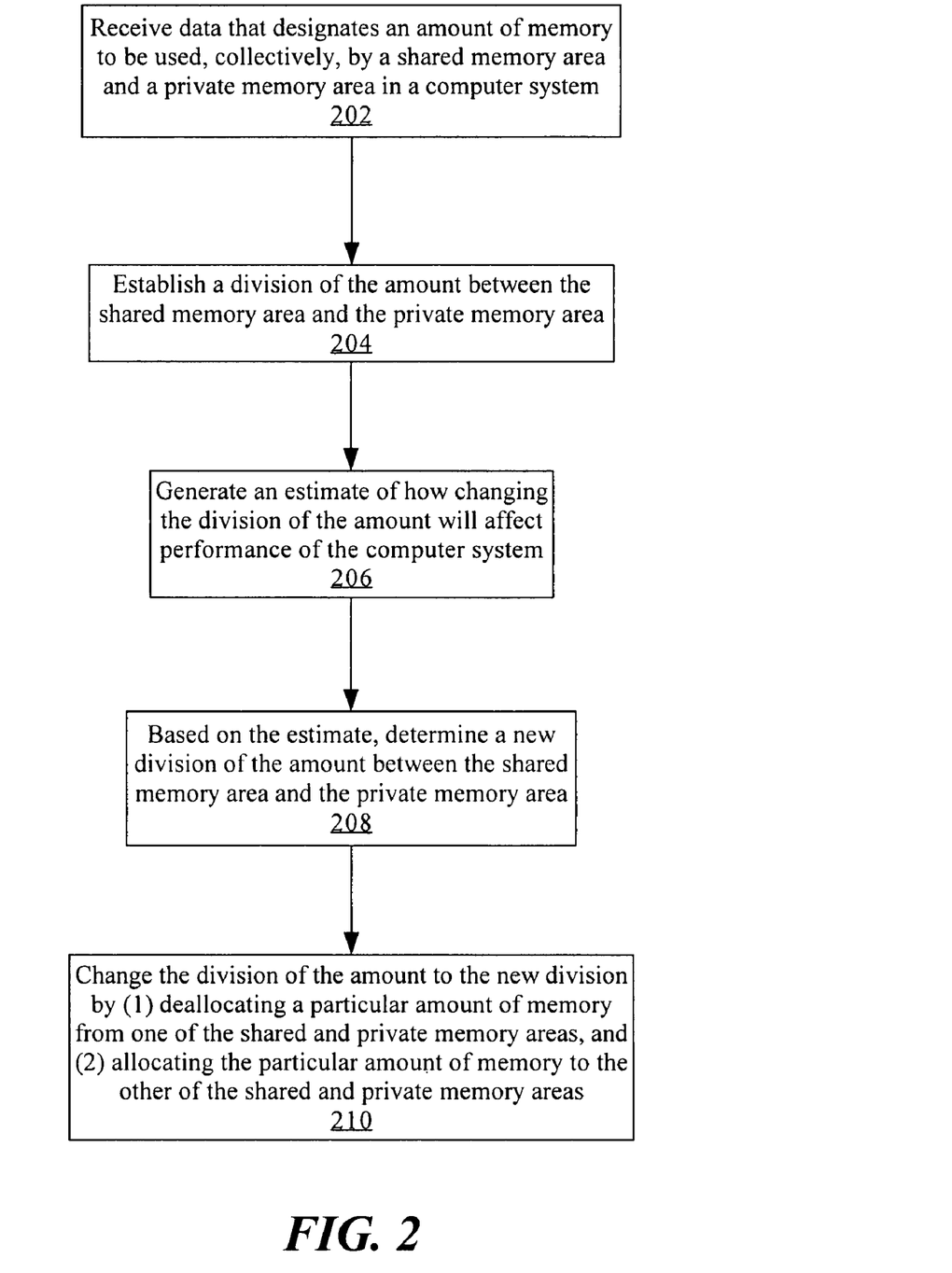
FIG. 2 is a flow diagram that illustrates a process of adjusting the division in the amount of memory between a shared memory and a private memory, according to an embodiment of the invention.

FIG. 2 is a flow diagram that illustrates a process of adjusting the division in the amount of memory between a shared memory area and a private memory area, according to and embodiment of the invention. In step 202, data is received that designates an amount of memory to be used, collectively, by the shared memory area and the private memory area in a computer system. The data may be received from a user, such as a DBA, or the data may be a default system parameter. The data may be read upon the initial start up of the computer system or upon a reboot of the computer system.

In step 204, a division is established of the amount of memory between the shared memory area and the private memory area. In step 206, an estimate is generated of how changing the division of the amount of memory will affect performance of the computer system based on the current workload, but not restricted to it. Such estimates are described in more detail under the section "MEMORY ADVISORY."

In step 208, based on the estimate, a new division of the amount between the shared memory area and the private memory area is determined. In step 210, the division of the amount to the new division may be changed by (1) deallocating a particular amount of memory from one of the shared and private memory areas, and (2) allocating the particular amount of memory to the other of the shared and private memory areas.

The result of step 210 may be used periodically in conjunction with the changing workload to reiterate through the dynamic auto-tuning flow control from step 206 to see if changing the size again will improve overall system performance. This iterative process keeps the SGA and PGA memory areas balanced for any given workload.

Physically Separate Memory Areas

The memory allocated to the shared memory area is not used as private memory area, either before and after the new division. This is made possible by physically separating the shared memory area and private memory area. The two memory areas are "physically separate" in that any portion of the shared memory area cannot be used as a private memory area and vice versa. One way in which the memory areas may be physically separated is by instructing the operating system of the computer system to modify the boundary between the shared memory area and the private memory area via a RAM board. A RAM board is configured to designate two portions of memory, one for the shared memory area and one for the private memory area. Thus, there is more than a simple logical division between the shared memory area and the private memory area; there is an actual physical separation between the two memory areas.

Figure 3A:
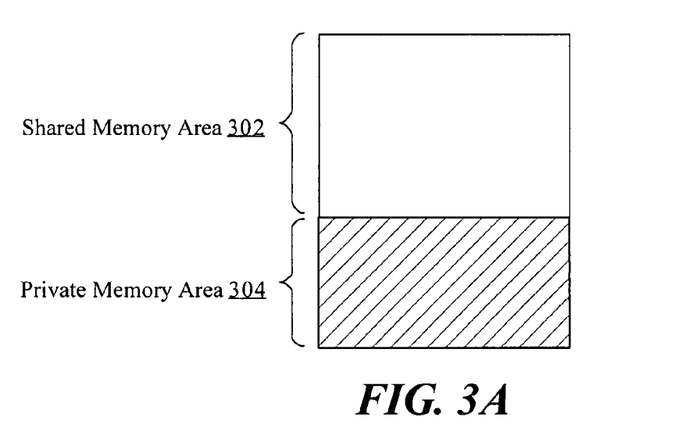
FIG. 3A-C are block diagrams that illustrate how the division in the amount of memory used, collectively, by a shared memory and a private memory may be changed, according to an embodiment of the invention.
Figure 3B:
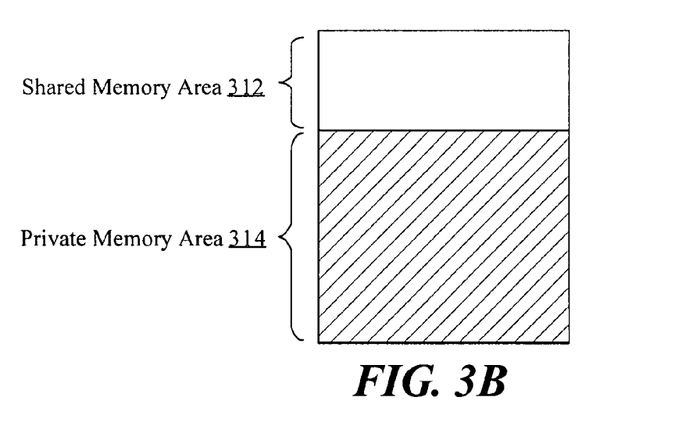
Figure 3C:
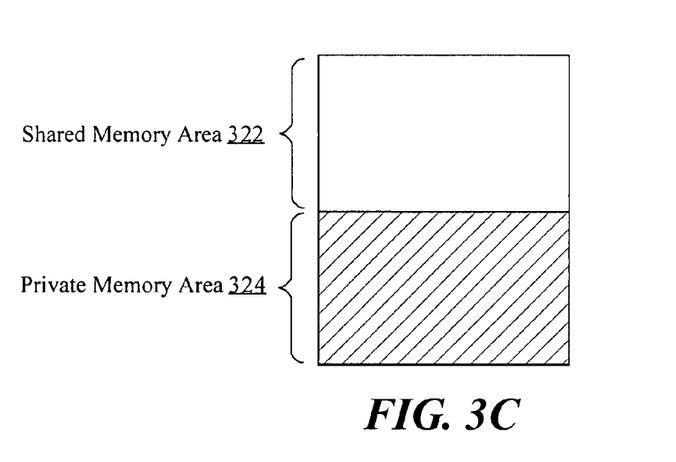

FIG. 3A-C are block diagrams that illustrate how the division in the amount of memory used, collectively, by a shared memory and a private memory may be changed, according to an embodiment of the invention. FIG. 3A illustrates what an initial division in the amount of memory between a shared memory area 302 and a private memory area 304. This amount of memory, which is specified by a single parameter, is referred to hereinafter as the "total memory area." Based on the initial division, shared memory area 302 comprises 60% of the total memory area and private memory area 304 comprises the remaining 40% of the total memory area. The initial division (60/40) may be a default setting when the computer system starts up or restarts.

FIG. 3B illustrates the result of implementing a change in the division to a new division (i.e., after step 210 of FIG. 2). After the new division is implemented, shared memory area 312 comprises 30% of the total memory area and private memory area 314 comprises the remaining 70% of the total memory area.

FIG. 3C illustrates the result of implementing another change in the division to a different division (i.e., after another step 210). After the different division is implemented, shared memory area 322 comprises 50% of the total memory area and private memory area 324 comprises the remaining 50% of the total memory area.

One of the benefits of physically separating shared memory and private memory is the avoidance of cross-component corruption. Because no portion of the shared memory area is used as a private memory area, corruptions in the private memory area will not affect the auto-tuning of the shared memory area. Also, when, for example, the shared memory area "relinquishes" memory to a private memory area, there will be no stale writes to affect the private memory area. Thus, the memory of the computer system (e.g., executing a single database instance) remains as diagnosable as before.

Auto-Tuning Each Memory Area Separately

Because a shared memory area and a private memory area are physically separate from each other, each memory area may be separately auto-tuned independent of the other memory area, both before a new division and after a new division, according to one embodiment. For example, after a division of the amount of memory between the shared memory area and the private memory area is established (step 204 of FIG. 2) and before a new division is determined (step 208), the shared memory area is auto-tuned independent of the private memory area and the private memory area is auto-tuned independent of the shared memory area.

Later, after the new division is determined (step 208) and while the amount of memory is divided based on the new division, the shared memory area is auto-tuned independent of the private memory area and the private memory area is auto-tuned independent of the shared memory area.

Memory Advisory

In one embodiment, a memory advisory (referred to hereinafter as MEM_ADV) is created for the combined amount of shared memory area and private memory area. A memory advisory is a process that provides advisories to a memory broker based on estimations (e.g., simulations and predictions) regarding the performance and total size of a particular memory. The memory broker uses the advisories, in conjunction with a set of policies, to determine whether to modify the allocation of the particular memory. Memory advisories exist for the different components of SGA and PGA in certain database servers.

For a non-limiting example, an advisory for a shared memory area (S_ADV) may operate as follows. Based on internal real-time simulations that are based on measurements of actual usage, S_ADV would estimate how the execution time changes with the size of the shared memory area. For example, if the shared memory area is under-configured for a given workload, S_ADV would predict that the execution time of the workload on the database instance would reduce by 20% if the shared memory area were increased by 30%. Similarly, another non-limiting example is an advisor for private memory area (P_ADV). Based on internal real-time simulations that are based on measurements of actual usage, P_ADV would estimate how the execution time changes with the size of the private memory area.

MEM_ADV estimates how execution time of the current workload would change as the sizes of the shared memory area and the private memory area either increase or decrease. For example, Table 1 illustrates what MEM_ADV may predict, given a current workload in both the shared and private memory area.

TABLE 1

| Change in division of amount of memory between shared and private memory | Change in execution time of workload in shared memory | Change in execution time of workload in private memory | Increase/decrease in total execution time (seconds, negative is a decrease) |
|---|---|---|---|
| X − d, Y + d | 1.4 | −3.5 | −1.8 |
| X + d, Y − d | −0.7 | 2.0 | +1.9 |
| X − 2d, Y + 2d | 3.0 | −0.4 | +2.4 |
| X + 2d, Y − 2d | −5.3 | 1.2 | −5.1 |
| X − 3d, Y + 4d | 3.5 | −0.3 | +3.3 |
| X + 4d, Y − 3d | −0.2 | 2.3 | +1.4 |

"X" represents the memory currently allocated to a shared memory area. "Y" represents the memory currently allocated to a private memory area. "d" represents a fixed amount of memory, such as 10 MB of memory.

The values in the second and third columns of Table 1 represent a multiplier of the execution time of the current workload in the shared memory area and the private memory area, respectively, if the proposed reallocation is implemented. The values in the second and third columns may come from the advisories for the shared memory area (S_ADV) and the private memory area (P_ADV), respectively. The values may be based on a CPU metric and/or disk I/O metric. For example, a particular component of shared memory area (e.g., a buffer cache), given its present size s, may be associated with a miss rate of m. S_ADV may indicate that doubling the size of the particular component (i.e., 2s) would decrease the associated miss rate by 75% (i.e., m/4).

The value in the last column of Table 1 is an estimate of the total change in execution time of the total workload in the total memory area comprising both shared and private memory areas if the proposed reallocation is implemented.

Thus, based on the first row of Table 1, if the shared memory area decreased 10 MB and the private memory area increased 10 MB, then the execution time of the current workload in the shared memory area would increase by 1.4 (or 40%), whereas the execution time of the current workload in the private memory area would decrease by 0.5 (or 50%). The total change in execution time of both workloads would be a decrease in 18 seconds.

A global memory broker process uses this exemplary MEM_ADV (and, optionally, a set of policies) to determine whether a reallocation of memory is desirable. An example of a simple policy is that only reallocations that decrease overall estimated execution time are considered. An example of another policy is that possible reallocations that increase the execution time of a workload in either the shared or private memory areas by at least a factor of 2.5 are ignored, regardless of the change in the overall estimated execution time.

The last two rows in Table 1 indicate that a possible reallocation (i.e., a new division) is not required to be a one-to-one tradeoff between the shared and private memory areas. As the second-to-last row in Table 1 indicates, 30 MB of memory may be deallocated from the shared memory area and 40 MB may be allocated to the private memory area. The "extra" 10 MB may come from memory that has not been allocated as either the shared memory area or the private memory area for at least a period of time. Additionally, no portion of the 40 MB allocated to the private memory area may have ever been allocated to the shared memory area.

The global memory broker may check MEM_ADV every second or every few seconds in order to react quickly to spikes in workloads. Additionally, examining MEM_ADV at least every few seconds may avoid runaway workloads that attempt to consume all available memory, thus crashing the system. For example, a rogue application may only request memory in a private memory area without using any memory that has been allocated to the application. By repeatedly tracking the rate of memory transfer and the amount of benefit (or loss) incurred by the receiver (or donor), as illustrated with MEM_ADV, runaway workloads that would crash the system may be avoided.

Views

Some database servers provide many (external) views of internal data and structures to DBAs. In one embodiment, a view of MEM_ADV is provided to a user, such as a DBA, so that a DBA may make a decision, based on the information displayed in the view, to manually adjust the division of the amount of memory between the shared and private memory areas. Thus, the DBA is not required to rely solely on the global memory broker to make the determination.

Addition Benefits of Embodiments of the Invention

Some of the benefits of embodiments of the invention have been outlined above, such as avoiding cross-component corruption and runaway workloads. Another benefit is the increase in flexibility of the present approach compared with the PGA-IN-SGA approach in that memory allocated to a private memory area may be deallocated and reallocated to a shared memory area. Also, a significant percentage of both the shared and private memory areas may be allocated to the other memory area.

Another benefit that may be realized is the avoidance of inter-memory (or cross memory) area fragmentation. In other words, PGA will not fragment SGA and SGA will not fragment PGA. There still may be fragmentation within PGA or SGA. However, such intra-memory area fragmentation is not caused by the other memory area.

Another benefit is that a DBA is not required to set a large number of memory parameters. Instead, only a single parameter that designates a total amount of a shared memory area and a private memory area may be necessary if a default value is not already set. Once the single parameter is designated, no further user involvement may be required in determining a division in the amount of memory used, collectively, by the shared and private memory areas. As stated above, a global memory broker (e.g., periodically) consults MEM_ADV (and, optionally, any policies) to automatically determine whether and how much to change the current division.

Another benefit is that components of each memory area may behave in a similar manner as before and, thus, those components do not require any changes. Therefore, backward compatible behavior is achieved without application-level changes from the end-user, DBA, or application developer.

Hardware Overview

Figure 4:
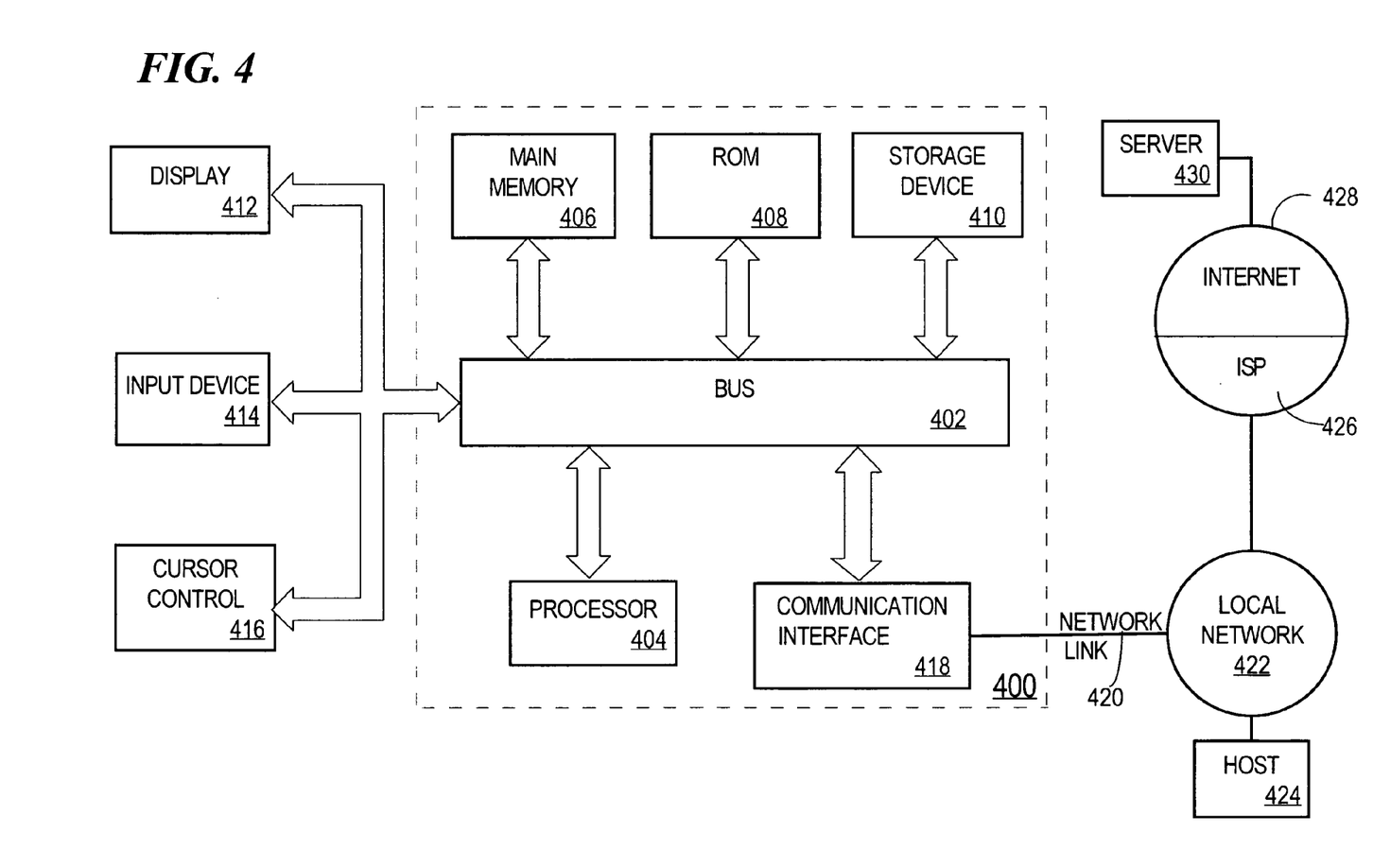
FIG. 4 is a block diagram that illustrates a computer system upon which an embodiment of the invention may be implemented

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for automatically tuning a memory of a computer system, comprising the steps of:
    receiving data that designates an amount of the memory to be used, collectively, by a first memory area and a second memory area;
    wherein addresses in the first memory area are accessible to multiple processes;
    wherein each address in the second memory area is dedicated to at most one process;
    establishing a division of said amount between the first memory area and the second memory area;
    generating an estimate of how changing the division of said amount between the first memory area and the second memory area will affect performance of the computer system;
    wherein generating the estimate comprises:
        estimating how performance of workload in the first memory area would change if the amount of memory in the first memory area were to increase or decrease, and
        estimating how performance of workload in the second memory area would change if the amount of memory in the second memory area were to increase or decrease;
    based on the estimate, determining a new division of said amount between the first memory area and the second memory area; and
    without restarting the computer system, changing the division of said amount to the new division by:
        deallocating a particular amount of memory from one of the set consisting of the first memory area and the second memory area, and
        allocating said particular amount of memory to the other of said set;
    wherein the steps are performed by one or more computing devices.

2. The method of claim 1, wherein both before and after the change of division, memory allocated to the first memory area is not used as memory for the second memory area.

3. The method of claim 1, further comprising, while the amount is divided based on the new division:
    auto tuning the first memory area independent of the second memory area; and
    auto tuning the second memory area independent of the first memory area.

4. A method for automatically tuning a memory of a computer system, comprising the steps of:
    receiving data that designates an amount of the memory to be used, collectively, for a first memory area and a second memory area;
    wherein addresses in the first memory area are accessible to multiple processes;
    wherein each address in the second memory area is dedicated to at most one process;
    establishing a division of said amount between said first memory area and said second memory area; and
    without restarting the computer system and without user input, changing the division of said amount between said first memory area and said second memory area to a new division;
    wherein both before and after the change of division, memory allocated to the first memory area is not used as memory for the second memory area;
    wherein the steps are performed by one or more computing devices.

5. The method of claim 4, wherein changing the division of said amount to the new division is performed by:
    deallocating a particular amount of memory from one or more pools of memory that are allocated to one of the set consisting of the first memory area and the second memory area; and allocating said particular amount of memory to one or more other pools of memory that allocated to the other of said set.

6. The method of claim 4, further comprising, while the amount is divided based on the new division:
auto tuning the pool of memory allocated to the first memory area independent of the pools of memory allocated to the second memory area; and
auto tuning the pools of memory allocated to the second memory area independent of the pool of memory allocated to the first memory area.

7. The method of claim 4, further comprising:
generating an estimate of how changing the division of said amount will affect performance of the computer system; and
based on the estimate, determining the new division of said amount between the first memory area and the second memory area.

8. A method for automatically tuning a memory of a computer system, comprising the steps of:
receiving data that designates an amount of the memory to be used, collectively, by a first memory area and a second memory area;
wherein addresses in the first memory area are accessible to multiple processes;
wherein each address in the second memory area is dedicated to at most one process;
establishing a division of said amount between the first memory area and the second memory area;
while the amount is divided based on the division:
auto tuning the first memory area independent of the second memory area, wherein auto tuning the first memory area comprises changing memory allocation between subcomponents of the first memory area; and
auto tuning the second memory area independent of the first memory area;
without restarting the computer system, changing the division of said amount of memory between the first memory area and the second memory area to a new division;
while the amount of memory is divided based on the new division:
auto tuning the first memory area independent of the second memory area wherein auto tuning the first memory area comprises changing memory allocation between subcomponents of the first memory area, and
auto tuning the second memory area independent of the first memory area;
wherein the steps are performed by one or more computing devices.

9. The method of claim 8, wherein both before and after the change of division, memory allocated to the first memory area is not used as memory for the second memory area.

10. The method of claim 8, wherein changing the division of said amount to the new division is performed by:
deallocating a particular amount of memory from one of the first memory area and the second memory area; and
allocating said particular amount of memory to the other of the first memory area and the second memory area.

11. The method of claim 8, further comprising:
generating an estimate of how changing the division of said amount will affect performance of the computer system; and
based on the estimate, determining the new division of said amount between the first memory area and the second memory area.

12. A method for automatically tuning a memory of a computer system, comprising the steps of:
receiving data that designates an amount of the memory to be used, collectively, by a first memory area and a second memory area;
wherein addresses in the first memory area are accessible to multiple processes;
wherein each address in the second memory area is dedicated to at most one process;
establishing a division of said amount between the first memory area and the second memory area;
generating an estimate of how changing the division of said amount between the first memory area and the second memory area will affect performance of the computer system;
wherein generating the estimate comprises:
estimating how performance of workload in the first memory area would change if the amount of memory in the first memory area were to increase or decrease, and
estimating how performance of workload in the second memory area would change if the amount of memory in the second memory area were to increase or decrease;
based on the estimate, determining a new division of said amount between the first memory area and the second memory area; and
without restarting the computer system, changing the division of said amount to the new division;
wherein both before and after the change of division, memory allocated to the first memory area is not used as memory for the second memory area;
wherein the steps are performed by one or more computing devices.

13. The method of claim 12, wherein changing the division of said amount to the new division is performed by:
deallocating a particular amount of memory from one of a set consisting of the first memory area and the second memory area; and
allocating said particular amount of memory to the other area of the set.

14. The method of claim 13, wherein the operating system associated with the computer system performs the steps of:
deallocating the particular amount of memory from one of said set; and
allocating said particular amount of memory to the other of said set.

15. The method of claim 12, wherein an advisory generates the estimate and periodically updates the estimate based on one or more updated performance metrics.

16. The method of claim 15, further comprising:
presenting a view of the advisory to a user;
receiving input, from the user, that indicates a particular division that is different than the new division; and
changing the division of said amount to the particular division.

17. The method of claim 15, wherein a global memory broker process determines, based on the estimate and a set of one or more policies, said new division.

18. The method of claim 12, further comprising, while the amount is divided based on the new division:
auto tuning the first memory area independent of the second memory area; and
auto tuning the second memory area independent of the first memory area.

19. One or more storage media storing instructions for automatically tuning a memory of a computer system, wherein the instructions, when executed by one or more processors, cause:
- receiving data that designates an amount of the memory to be used, collectively, by a first memory area and a second memory area;
- wherein addresses in the first memory area are accessible to multiple processes;
- wherein each address in the second memory area is dedicated to at most one process;
- establishing a division of said amount between the first memory area and the second memory area;
- generating an estimate of how changing the division of said amount between the first memory area and the second memory area will affect performance of the computer system;
- wherein generating the estimate comprises:
  - estimating how performance of workload in the first memory area would change if the amount of memory in the first memory area were to increase or decrease, and
  - estimating how performance of workload in the second memory area would change if the amount of memory in the second memory area were to increase or decrease;
- based on the estimate, determining a new division of said amount between the first memory area and the second memory area; and
- without restarting the computer system, changing the division of said amount to the new division by:
  - deallocating a particular amount of memory from one of the set consisting of the first memory area and the second memory area, and
  - allocating said particular amount of memory to the other of said set.

20. The one or more storage media of claim 19, wherein both before and after the change of division, memory allocated to the first memory area is not used as memory for the second memory area.

21. The one or more storage media of claim 19, wherein the instructions include additional instructions which, when executed by the one or more processors, further cause, while the amount is divided based on the new division:
- auto tuning the first memory area independent of the second memory area; and
- auto tuning the second memory area independent of the first memory area.

22. One or more storage media storing instructions for automatically tuning a memory of a computer system, wherein the instructions, when executed by one or more processors, cause:
- receiving data that designates an amount of the memory to be used, collectively, for a first memory area and a second memory area;
- wherein addresses in the first memory area are accessible to multiple processes;
- wherein each address in the second memory area is dedicated to at most one process;
- establishing a division of said amount between said first memory area and said second memory area; and
- without restarting the computer system and without user input, changing the division of said amount between said first memory area and said second memory area to a new division;
- wherein both before and after the change of division, memory allocated to the first memory area is not used as memory for the second memory area.

23. The one or more storage media of claim 22, wherein changing the division of said amount to the new division is performed by:
- deallocating a particular amount of memory from one or more pools of memory that are allocated to one of the set consisting of the first memory area and the second memory area; and
- allocating said particular amount of memory to one or more other pools of memory that allocated to with the other of said set.

24. The one or more storage media of claim 22, wherein the instructions include additional instructions which, when executed by the one or more processors, further cause, while the amount is divided based on the new division:
- auto tuning the pool of memory allocated to the first memory area independent of the pools of memory allocated to the second memory area; and
- auto tuning the pools of memory allocated to the second memory area independent of the pool of memory allocated to the first memory area.

25. The one or more storage media of claim 22, wherein the instructions include additional instructions which, when executed by the one or more processors, further cause:
- generating an estimate of how changing the division of said amount will affect performance of the computer system; and
- based on the estimate, determining the new division of said amount between the first memory area and the second memory area.

26. One or more storage media storing instructions for automatically tuning a memory of a computer system, wherein the instructions, when executed by one or more processors, cause:
- receiving data that designates an amount of the memory to be used, collectively, by a first memory area and a second memory area;
- wherein addresses in the first memory area are accessible to multiple processes;
- wherein each address in the second memory area is dedicated to at most one process;
- establishing a division of said amount between the first memory area and the second memory area;
- while the amount is divided based on the division:
  - auto tuning the first memory area independent of the second memory area, wherein auto tuning the first memory area comprises changing memory allocation between subcomponents of the first memory area; and
  - auto tuning the second memory area independent of the first memory area;
- without restarting the computer system, changing the division of said amount of memory between the first memory area and the second memory area to a new division;
- while the amount of memory is divided based on the new division:
  - auto tuning the first memory area independent of the second memory area, wherein auto tuning the first memory area comprises changing memory allocation between subcomponents of the first memory area, and
  - auto tuning the second memory area independent of the first memory area.

27. The one or more storage media of claim 26, wherein both before and after the change of division, memory allocated to the first memory area is not used as memory for the second memory area.

28. The one or more storage media of claim 26, wherein changing the division of said amount to the new division is performed by:
   deallocating a particular amount of memory from one of the first memory area and the second memory area; and
   allocating said particular amount of memory to the other of the first memory area and the second memory area.

29. The one or more storage media of claim 26, wherein the instructions include additional instructions which, when executed by the one or more processors, further cause:
   generating an estimate of how changing the division of said amount will affect performance of the computer system; and
   based on the estimate, determining the new division of said amount between the first memory area and the second memory area.

30. One or more storage media storing instructions for automatically tuning a memory of a computer system, wherein the instructions, when executed by one or more processors, cause:
   receiving data that designates an amount of the memory to be used, collectively, by a first memory area and a second memory area;
   wherein addresses in the first memory area are accessible to multiple processes;
   wherein each address in the second memory area is dedicated to at most one process;
   establishing a division of said amount between the first memory area and the second memory area;
   generating an estimate of how changing the division of said amount between the first memory area and the second memory area will affect performance of the computer system;
   wherein generating the estimate comprises:
      estimating how performance of workload in the first memory area would change if the amount of memory in the first memory area were to increase or decrease, and
      estimating how performance of workload in the second memory area would change if the amount of memory in the second memory area were to increase or decrease;
   based on the estimate, determining a new division of said amount between the first memory area and the second memory area; and
   without restarting the computer system, changing the division of said amount to the new division;
   wherein both before and after the change of division, memory allocated to the first memory area is not used as memory for the second memory area.

31. The one or more storage media of claim 30, wherein changing the division of said amount to the new division is performed by:
   deallocating a particular amount of memory from one of a set consisting of the first memory area and the second memory area; and
   allocating said particular amount of memory to the other area of the set.

32. The one or more storage media of claim 31, wherein the operating system associated with the computer system performs the steps of:
   deallocating the particular amount of memory from one of said set; and
   allocating said particular amount of memory to the other of said set.

33. The one or more storage media of claim 30, wherein an advisory generates the estimate and periodically updates the estimate based on one or more updated performance metrics.

34. The one or more storage media of claim 33, wherein the instructions include additional instructions which, when executed by the one or more processors, further cause:
   presenting a view of the advisory to a user;
   receiving input, from the user, that indicates a particular division that is different than the new division; and
   changing the division of said amount to the particular division.

35. The one or more storage media of claim 33, wherein a global memory broker process determines, based on the estimate and a set of one or more policies, said new division.

36. The one or more storage media of claim 30, wherein the instructions include additional instructions which, when executed by the one or more processors, further cause, while the amount is divided based on the new division:
   auto tuning the first memory area independent of the second memory area; and
   auto tuning the second memory area independent of the first memory area.

* * * * *

UNITED STATES PATENT AND TRADEMARK OFFICE
CERTIFICATE OF CORRECTION

| | | |
|---|---|---|
| PATENT NO. | : 8,099,577 B2 | Page 1 of 1 |
| APPLICATION NO. | : 11/726060 | |
| DATED | : January 17, 2012 | |
| INVENTOR(S) | : Baddepudi et al. | |

It is certified that error appears in the above-identified patent and that said Letters Patent is hereby corrected as shown below:

On Title page, item [75], in column 1, under "Inventors", line 1, delete "Palo Atlo, CA" and insert -- Palo Alto, CA --, therefor.

In column 4, line 34, after "implemented" insert -- . --.

In column 5, line 53, after "to" delete "and" and insert -- an --, therefor.

In column 13, line 2, in Claim 5, after "that" insert -- are --.

In column 13, line 45, in Claim 8, delete "area" and insert -- area, --, therefor.

In column 16, line 12, in Claim 23, after "that" insert -- are --.

Signed and Sealed this
Third Day of April, 2012

David J. Kappos
*Director of the United States Patent and Trademark Office*